Nov. 27, 1945.  J. W. GREIG  2,389,974
APPARATUS FOR FORMING SHEET MATERIAL
Filed Oct. 5, 1942  3 Sheets-Sheet 1

INVENTOR
James W. Greig.
BY
ATTORNEYS.

Nov. 27, 1945. J. W. GREIG 2,389,974
APPARATUS FOR FORMING SHEET MATERIAL
Filed Oct. 5, 1942 3 Sheets-Sheet 2

INVENTOR.
James W. Greig.
BY Gray & Smith
ATTORNEYS.

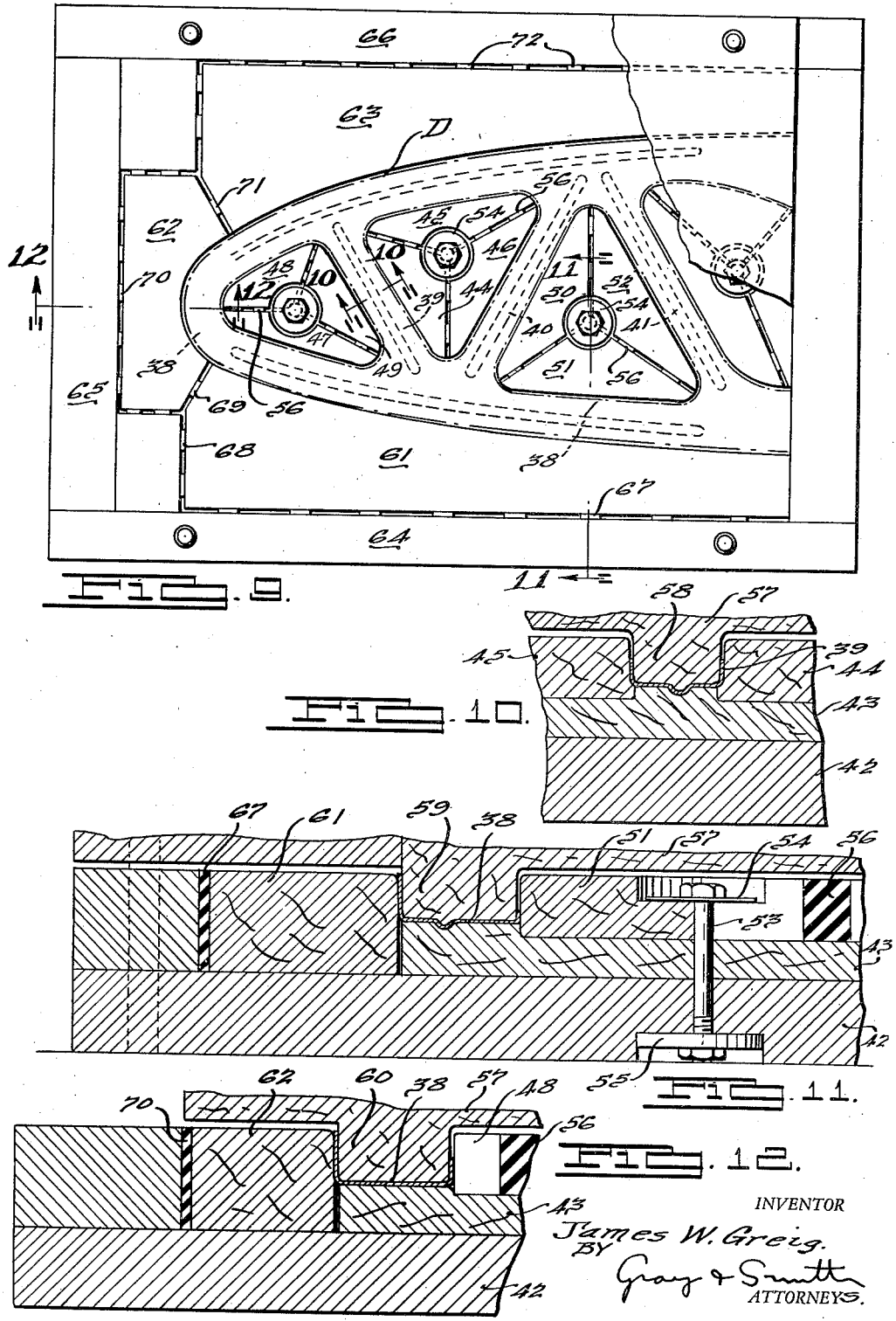

Patented Nov. 27, 1945

2,389,974

UNITED STATES PATENT OFFICE 2,389,974

APPARATUS FOR FORMING SHEET MATERIAL

James W. Greig, Grosse Pointe Park, Mich., assignor to Hudson Motor Car Company, Detroit, Mich., a corporation of Michigan Application October 5, 1942, Serial No. 460,891

8 Claims. (Cl. 153—48)

This invention relates to an apparatus for forming sheet material by stamping or press operations and is especially applicable to the formation of articles, including various shapes and types of structural members, from aluminum, which term is used to comprehend the alloys of aluminum commonly used in industry. Although the present invention finds important usage in connection with the manufacture of aluminum articles, such as structural parts, panels and other members, utilized in aircraft production, it will be readily apparent that many other uses or applications of the invention will be apparent to those skilled in the art.

Heretofore, considerable experimentation has been undertaken for the purpose of utilizing rubber in the construction of dies for stamping or forming articles out of aluminum. Some commercial usages of so-called rubber dies have been found in the fabrication of aluminum aircraft parts, although where dies of this type have been resorted to, it has usually been necessary to make large portions of the dies out of rubber having relatively high elastic qualities. In addition to the difficulties involved in controlling the press operations and obtaining accuracy and uniformity in the production of parts from these dies, there is, of course, the additional objection arising at the present time on account of the large amount of rubber required in the fabrication of the dies.

One of the objects of the present invention is to eliminate the disadvantages well known in the industry to the use of rubber dies in the formation by stamping or pressing operations of articles and parts from aluminum or other sheet metal, and to provide an improved apparatus for stamping out parts and articles in a variety of shapes or sections, which apparatus preserves all advantages which may heretofore have been attendant upon the use of so-called rubber dies while at the same time affording a high degree of accuracy and uniformity in production.

A further object of the invention is to provide an improved die apparatus for stamping out various articles from sheet material, especially structural parts and sections of aluminum, which apparatus is extremely inexpensive to make, utilizing inexpensive materials and requiring a minimum of labor to fabricate the die parts, and having a relatively long life with an unusually large production capacity.

Still a further object of the invention is to provide an improved die mechanism or apparatus in which the use of rubber in any of the work contacting portions of the dies and the consequent disadvantages thereof are eliminated.

Another object of the invention is to provide an apparatus for stamping or forming metallic articles, such as panels and structural members of aluminum, wherein expensive metal or rubber dies are eliminated, the invention enabling the use of inexpensive and easy to fabricate material, such as hard wood, in the making of the dies, or major portions thereof, which provide work contacting surfaces.

A further object of the invention is to provide a die apparatus of the foregoing type in which portions of the die are constructed to yield during the stamping or forming operation, this yield being permitted by the use of rubber compression elements incorporated into the apparatus in a novel and improved manner.

A still further object of the invention is to provide a die apparatus having preferably non-metallic working portions of a relatively hard, durable material, such as hard wood, and compression elements of rubber associated therewith in such manner as to enable the dies to accommodate considerable variations in the gauge of the sheet material, such as aluminum, fabricated in the apparatus.

Other objects of this invention will appear in the following description and appended claims, reference being had to the accompanying drawings forming a part of this specification wherein like reference characters designate corresponding parts in the several views.

Fig. 9 is a plan view, partly broken away, of a die apparatus illustrating another embodiment of the invention.

Fig. 10 is an enlarged fragmentary sectional view taken substantially through lines 10—10 of Fig. 9 looking in the direction of the arrows.

Fig. 11 is an enlarged fragmentary sectional view taken substantially through lines 11—11 of Fig. 9 looking in the direction of the arrows.

Fig. 12 is an enlarged fragmentary sectional view taken substantially through lines 12—12 of Fig. 9 looking in the direction of the arrows.

Figure 1:
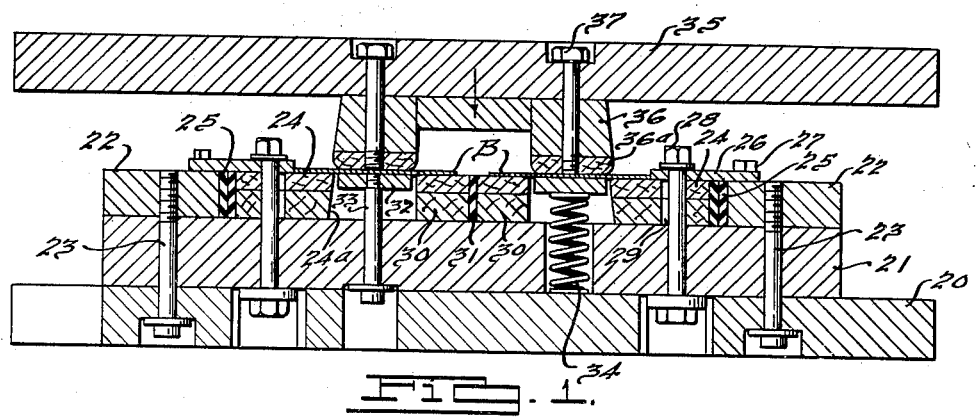
Fig. 1 is a sectional elevation of a die apparatus constructed in accordance with one embodiment of the invention, the parts being shown at the start of the operation.
Figure 2:
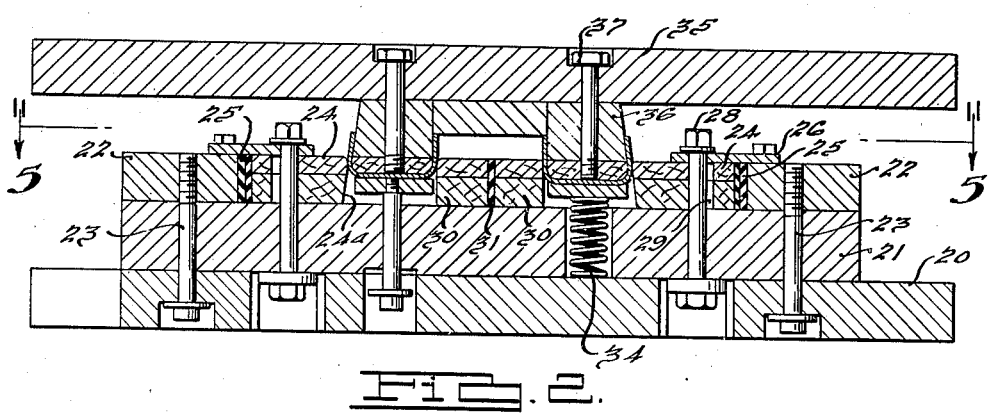
Fig. 2 is a similar view showing an intermediate point in the working stroke of the ram or punch.
Figure 3:
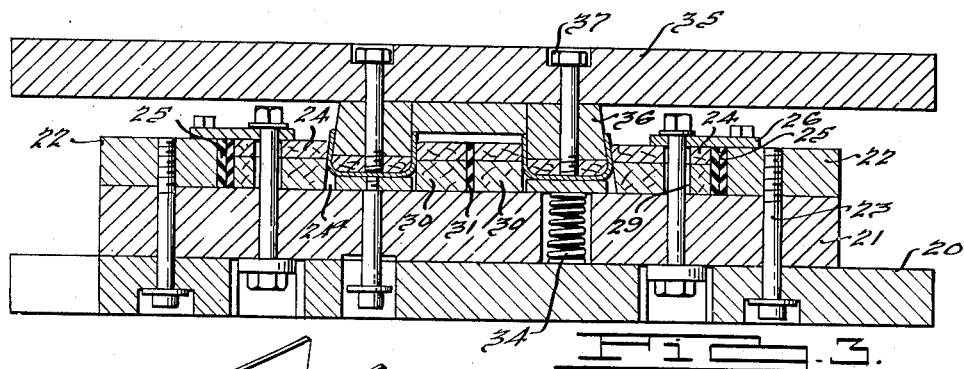
Fig. 3 is a similar view showing the parts at the end of the working stroke.
Figure 4:
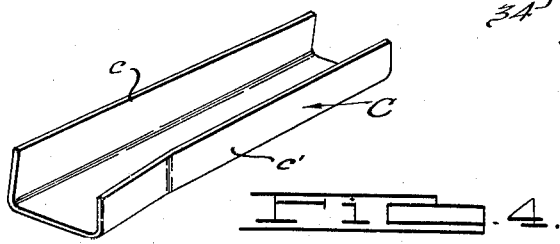
Fig. 4 is a perspective view of an article formed by the apparatus of the foregoing embodiment.
Figure 5:
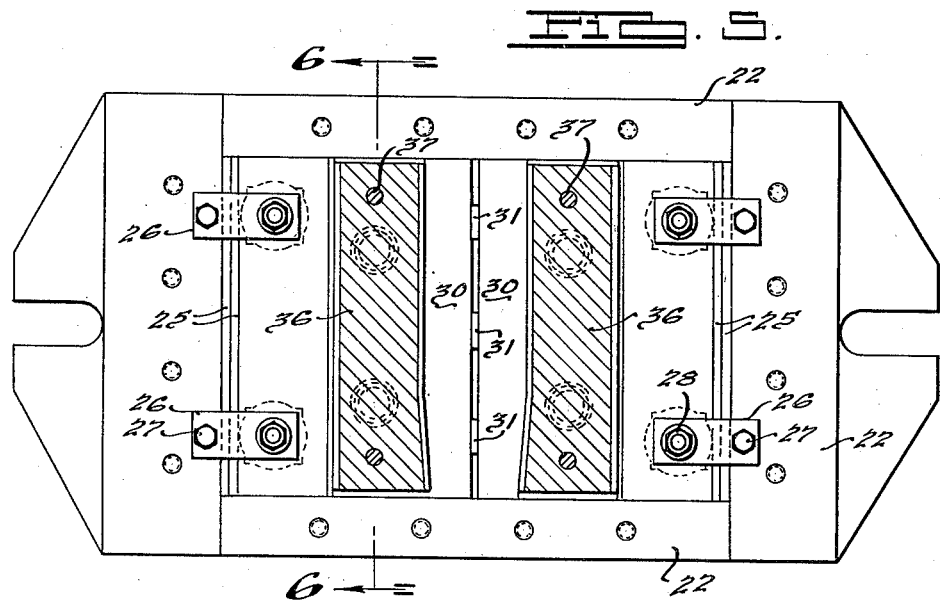
Fig. 5 is a horizontal section taken substantially through lines 5—5 of Fig. 2 looking in the direction of the arrows.
Figure 6:
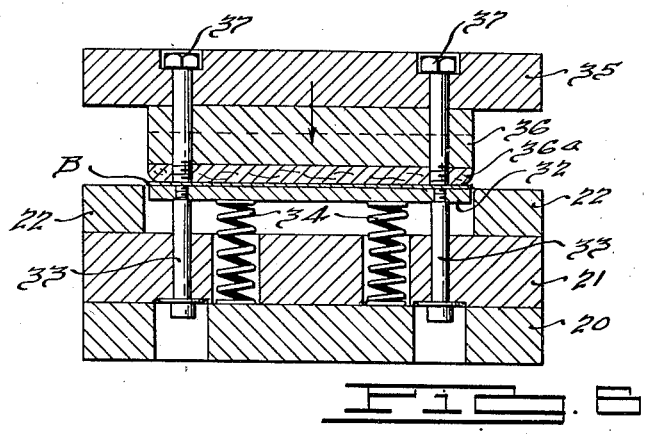
Fig. 6 is a vertical section taken substantially through lines 6—6 of Fig. 5 looking in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the embodiment illustrated in Figs. 1 to 6 inclusive, wherein an apparatus is shown for stamping or forming a pair of channel sections C from flat strips or blanks of aluminum B, there is shown at 20 a bed or base of a suitable press. Upon this bed is mounted a steel pad 21 which carries backing or end abutment plates 22 secured by through bolts 23 to the pad and bed of the press.

Facing the abutment or limit plates 22 are die members or die blocks 24 composed preferably of a hard non-metallic material such as wood or synthetic resinous composition. For example, maple wood may be used. A suitable resinous composition may be one of the thermo-setting resins, such as a modified phenol-formaldehyde, urea-formaldehyde or melamine type resin. The die sections or blocks 24 may be made in one piece or laminated as shown.

Interposed between the die members 24 and abutment plates 22 are rubber strips 25. These strips are formed of highly elastic or yieldable rubber and are relatively thin. In the foregoing embodiment twin strips 25 of thin rubber are used. The die members 24 are retained in vertical positions by means of retainer or hold-down plates 26 secured by screws 27 to the members 22. The hold-down plates are also anchored to the pad 21 by through bolts 28 which extend through guide slots 29 in the die members 24. This construction permits the die members to slide on the pad slight distances toward and from the abutment plates 22, the die members being guided by the guide bolts 28 and held down on the pad by the plates 26. Thus, the die members 24 are free to move against the rubber strips 25.

It will be understood that the outside die members 24 form corresponding sides $c$ of a pair of work pieces C. The other corresponding sides $c'$ of the two work pieces produced in the apparatus of the present embodiment are formed by a pair of adjacent die sections or blocks 30. These are preferably fabricated of material similar to the die members 24 and may be laminated as shown. Interposed between the die members 30 is a thin rubber strip 31 of preferably highly elastic rubber.

Extending between each companion or cooperating pair of die members 24 and 30, and lying within the cavity therebetween, is a pressure plate or pad 32 guided for vertical movement by guide pins 33 extending through holes in the pad 21. These plates 32 engage compression springs 34 housed within wells in the pad 21.

The present apparatus includes a punch plate 35 adapted to be secured to and operated by the reciprocating ram of the press. A pair of male punch or die members 36 are secured to the bottom of the plate 35 by bolts 37. If desired, as shown in the drawings, the male die or punch members 36 may be composed of metal as a foundation material having facing or contact surfaces 36a formed of wood or other non-metallic material of the kind above described.

Figures 7, 8:
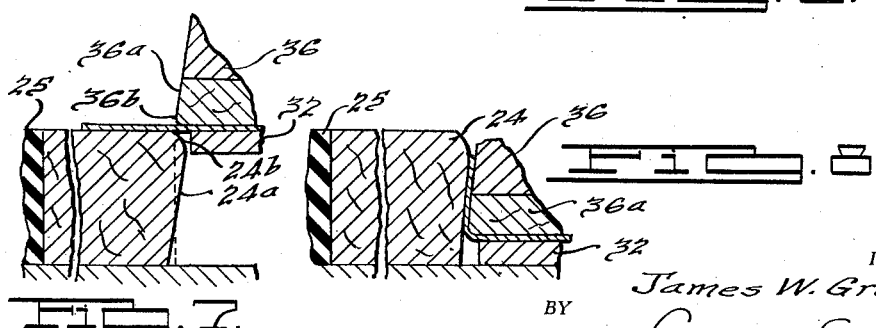
Figs. 7 and 8 are fragmentary somewhat diagrammatic sections of die portions.

In the above described embodiment the work piece C is channel-shaped, and to illustrate one of the advantages of the invention in the production of different shapes the side $c$ of the work piece is inclined with respect to the side $c'$, extending at an angle less than a right angle to the web of the channel. In producing this shape, as illustrated more or less diagrammatically in Figs. 7 and 8, the dies 36 and 30 have corresponding parallel vertical sides which form up the side $c'$ of the work piece. At the opposite side the punch or die member 36 is inclined at 36a in accordance with the inclination of the side $c$ of the work piece, this side of the punch terminating in a rounded corner 36b of relatively small radius. The corresponding side of the die 24 is undercut to provide an inclined wall 24a parallel to wall 36a and terminating at its upper edge in a rounded corner 24b. This corner may have a greater radius than the corner 36b to give a more effective camming action when the punch descends and the corner 36b travels down over the corner 24b. This action, as clearly seen in Fig. 7, will result in shifting the die 24 laterally or outwardly against the rubber strips 25, squeezing the rubber and placing it under high compressive force. The corner 36b of the punch 36 overlaps or overhangs the wall 24a, as shown in dotted lines in Fig. 7, preferably by at least the thickness of the metal sheet B. In the present instance this overhang exceeds the thickness of the metal in order to more effectively accommodate greater variations in the thickness of the metal used and also to increase the compressive force exerted on the rubber 25 so that the reaction effort of the rubber will be sufficient to form the bend or inclination in the wall $c$. As the corner 36b travels down over the corner 24b and thence along the inclined wall 24a, the blank B will be wiped upwardly around the corner 36b of the punch, the return pressure of the die 24, due to the reaction force of the rubber, forcing the wall 24a inwardly to form the side $c$ of the work piece in accordance with the inclination of the wall 36a of the punch, as illustrated in Fig. 8.

In the embodiment of the invention illustrated in Figs. 9 to 12 inclusive the die apparatus is constructed to form from an aluminum blank or sheet a rib section D of an airplane wing. The article D, as clearly seen in Fig. 9, comprises a marginal channel-shaped web 38 connected by angularly related ribs 39, 40 and 41, also channel-shaped. Generally triangular spaces remain between the web and connecting ribs. The press comprises a base or bed 42 upon which is mounted a pad 43 shaped to form with the punch the bottom configuration of the various portions of the article. In the triangular space between the ribs 39 and 40 of the article, viewed from the position of the parts of the drawings, is a set of three cooperating triangular die sections or blocks 44, 45 and 46. The bottom die also comprises similar sets of three cooperating die sections or blocks 47 to 49 and 50 to 52. The cooperating die sections of each set are held down by a bolt 53 and washers or disks 54, 55. The cooperating die sections or die blocks 44—46, 47—49 and 50—52, in each instance, are somewhat spaced apart along their adjacent edges and in these spaces are located a number of relatively thin strips 56 of live rubber.

The punch or upper die 57 has forming sections 58, 59 and 60, as seen in Figs. 10 to 12 inclusive, adapted to cooperate with the die sections to assist in forming the flat metal blank into the channel shapes shown in the drawings. In each instance the lower rounded corners of the punch sections 58, 59 and 60 normally overhang or overlap the upper adjacent rounded corners of the die sections, as described in connection with Figs. 7 and 8, an amount preferably at least as great as the thickness of the metal of the blank. As the punch sections move down to force the flat blank between the various sets of die sections 44—52, the latter will be caused to back up or retract slightly, compressing the rubber strips. Spaces are left between the punch and die to permit flow of the rubber.

The outer flanged margin of the article D is formed between the punch sections 59, 60 and outer die sections 61, 62 and 63, the latter having the configuration illustrated in Fig. 9. The die sections 61—63 are yieldable or slidable laterally and are backed up by fixed abutment plates 64, 65 and 66 of the bed or frame of the press. Interposed between section 61 and the frame 64 are a number of elastic rubber strips 67. Similarly rubber strips 68 are interposed between die section 61 and the frame 65. Also rubber strips 69 are interposed between die sections 61 and 62. Rubber strips 70 are interposed between die section 62 and frame 65. Rubber strips 71 and 72, respectively, are interposed between section 63, die section 71 and frame portion 66.

As previously described, the lower outer rounded corners of the punch sections 59 and 60 overhang the upper adjacent rounded edges of the outer die sections 61, 62 and 63 a distance preferably at least as great as the thickness of the metal D. Thus, during the forming operation these die sections will be forced back or outwardly slightly against the action of the yieldable rubber strips 67—72. As in the previous embodiment, a very smooth accurately formed article is produced, and this regardless of variations in the gauge of the metal used. Hence, the present die apparatus with the same die members is admirably adapted for use with different gauges of sheet metal. It will be understood that the cooperating punch and die sections of the embodiment last described are preferably formed of non-metallic material, such as maple wood, resin of the "bakelite" type or similar composition capable of accomplishing the desired objects of the invention. Their operation is mainly similar to that described in connection with the previous embodiment.

I claim:

1. In a die apparatus, a die adapted to receive and support a blank to be stamped, said die having a die cavity across the top of which said blank is adapted to extend, said die having a portion thereof forming a wall of said cavity and supported for limited lateral movement, a fixed abutment extending along the outer side of said portion in spaced relation thereto, relatively thin rubber strip material bridging the space between the adjacent sides of said abutment and die portion and confined thereby along opposite outer side faces of the material, a punch shiftable into said die cavity to bend said blank into a space between the punch and said wall of the die produced at least in part to accommodate the thickness of the blank by shifting said die portion laterally against the resistance of said strip material to cause the material to flow edgewise in the direction of the plane of the strip material, and means for maintaining the outer side faces of the strip material confined against substantial displacement relative to adjacent sides of the abutment and die portion, said strip material returning said die portion to its normal position upon retraction of the punch.

2. In a die apparatus, a die adapted to receive and support a blank to be stamped, said die having a die cavity and a die member forming a wall of said cavity and supported for limited lateral sliding movement outwardly of the cavity, a fixed abutment extending along the outer side of said die member in spaced relation thereto, relatively thin rubber strip material bridging the space between the adjacent sides of said abutment and die member and confined thereby along the outer side faces of the material, a punch shiftable into said die cavity to bend said blank into a space between the punch and said wall of the die produced at least in part to accommodate the thickness of the blank by shifting said die member laterally against the resistance of said strip material to squeeze the same between the die member and abutment and cause the strip material to flow edgewise in the direction of its plane, and means for confining the outer side faces of the strip material against substantial displacement relative to adjacent sides of the abutment and die member with which the material is in contact, said strip material returning said die member to its normal position upon retraction of the punch.

3. In a die apparatus, a die adapted to receive and support a blank to be stamped, said die having a die cavity and a die member forming a wall of said cavity and supported for limited lateral sliding movement outwardly of the cavity, a fixed abutment extending along the outer side of said die member in spaced relation thereto, relatively thin flat rubber strip material bridging the space between the adjacent sides of said abutment and die member and confined thereby along the outer side faces of the material, said faces being in intimate contact throughout the major area thereof with adjacent faces of said abutment and die member, a punch shiftable into said die cavity to bend said blank into a space between the punch and said wall of the die produced at least in part to accommodate the thickness of the blank by shifting said die member laterally against the resistance of said strip material to squeeze the same between the die member and abutment and cause the strip material to flow edgewise in the direction of its plane, and means for confining the outer side faces of the strip material against substantial displacement relative to adjacent sides of the abutment and die member with which the material is in contact, said strip material returning said die member to its normal position upon retraction of the punch.

4. In a die apparatus, a die adapted to receive and support a blank to be stamped, said die having a die cavity and a die member forming a wall of said cavity and supported for limited lateral sliding movement outwardly of the cavity, a fixed abutment extending along the outer side of said die member in spaced relation thereto, a plurality of spaced apart sections of rubber strip material arranged in the space between said die member and abutment in intimate contact therewith and confined thereby at the outer side faces of the material, a punch shiftable into said die cavity to bend said blank into a space between the punch and said wall of the die produced at least in part to accommodate the thickness of the blank by shifting said die member laterally against the resistance of said strip material to squeeze the same between the die member and abutment and cause the strip material to flow edgewise in the direction of its plane, and means for confining the outer side faces of the strip material against substantial displacement relative to adjacent sides of the abutment and die member with which the material is in contact, said strip material returning said die member to its normal position upon retraction of the punch.

5. In a die apparatus, a female die comprising a fixed base, a movable die member slidable on said base laterally a limited distance, a fixed abutment extending along the outer side of the die member with the adjacent walls of the die member and abutment spaced apart, a plurality of strips of relatively thin rubber strip material interposed between said walls in intimate contact therewith and spaced apart along the length of said walls, and means for shifting said die member laterally to squeeze said strips and cause the material to flow edgewise along the length of said walls and also in a direction outwardly thereof.

6. In a die apparatus, a female die comprising a fixed base, a movable die member slidable on said base laterally a limited distance, a fixed abutment extending along the outer side of the die member with the adjacent walls of the die member and abutment spaced apart, a plurality of strips of relatively thin flat rubber strip material interposed between said walls in intimate contact therewith substantially throughout the areas of the strips and spaced apart along the length of said walls, and means for shifting said die member laterally to squeeze said strips and cause the material to flow edgewise along the length of said walls and also in a direction outwardly thereof.

7. In a die apparatus, a female die, means for supporting said die for lateral sliding movement a limited distance, a fixed abutment extending along the outer side of the female die, a strip of relatively thin flat rubber material fitting closely between adjacent walls of the abutment and die member and confined therebetween substantially throughout the area of the material but free along an edge or edges thereof, said female die adapted to be shifted by the action of a punch or the like to squeeze said strip material and cause the material to flow edgewise.

8. In a die apparatus, a female die, means for supporting said die for lateral sliding movement a limited distance, a fixed abutment extending along the outer side of the female die, a plurality of endwise spaced sections of relatively thin flat rubber strip material fitting closely between adjacent walls of the abutment and die member and confined therebetween substantially throughout the area of the material but free along an edge or edges thereof, said female die adapted to be shifted by the action of a punch or the like to squeeze said strip material and cause the material to flow edgewise but not to flow to any appreciable extent transversely of the plane of the material.

JAMES W. GREIG.